Patented Apr. 8, 1930

1,754,148

UNITED STATES PATENT OFFICE

KENNETH F. COOPER, OF GREAT NECK, NEW YORK, ASSIGNOR TO AMERICAN CYANAMID COMPANY, OF NEW YORK, N. Y., A CORPORATION OF MAINE

FUMIGATING COMPOUND AND PROCESS OF PRODUCING THE SAME

No Drawing.  Application filed May 24, 1923. Serial No. 641,260.

This invention relates to a finely divided fumigating compound as well as a method of using the same, and has for its object to provide an article and a process adapted for fumigating purposes which will be better adapted for use in the destruction of animal and insect pests, scale, and the like than those heretofore proposed.

With these and other objects in view the invention consists in the novel steps and combinations of steps constituting the process and in the novel finely divided material constituting the article of manufacture, all as will be more fully hereinafter disclosed and particularly pointed out in the claims.

The invention when more particularly stated relates to a dusting material containing sodium cyanide, calcium cyanide, or a mixture of these compounds in a finely divided condition, suitable to be used in destroying various forms of plant and animal life with particular reference to insect pests. When calcium cyanide is the material used for the destruction of pests, it is, of course, understood that the material does not necessarily contain any alkali metal compounds. It is to be brought in actual contact with them or in such close proximity that the toxic gas liberated will be effective, and its use is not limited to closed compartments and confined spaces. Crops in the open may effectually be treated under the most varied conditions.

The method of applying this material is such that a poisonous gas will be liberated by the moisture of the air with which it comes in contact. This method also is such that it will accomplish the destruction of insects, etc., upon any surface with the least possible expenditure of insecticidal material.

In addition to the effective concentration and the toxic effect of the gas, liberated at the point required and in actual contact or close proximity to the insects to be destroyed, this method is found to be more effective than the prior methods using the same quantity of cyanide due to the fact that the liberated gas is in a fresh or nascent state.

As an illustration of this invention one may mix one part of a crude cyanide material of the nature of that disclosed in U. S. patent to Walter S. Landis, No. 1,359,257, with from two to nine parts of a diluent such as talc, the whole being ground to an impalpable powder. This is dusted upon the plant foliage, or other surfaces on which the insects to be destroyed are located. In the course of a few hours, the cyanide is found to be completely decomposed in the presence of the moisture of the air with the liberation of the entire cyanogen content in the form of hydrocyanic acid gas. The calcium cyanide material described in the above identified Landis patent contains alkali metal compounds when the process is carried out with a flux of sodium chloride. If no flux is used or if a halogen salt of an alkaline earth metal is used, as definitely stated in the said patent, the material is free from alkali metal compounds. If a high grade of calcium cyanamide is used in the Landis process, and the smaller amounts of fluxes are used therein, the resulting product may contain well over 50% calcium cyanide. The calcium cyanide content of the material is substantially soluble in 92% ethyl alcohol and in commercial absolute methyl alcohol.

The powdered form of the material of this invention enables one to direct the action of the insecticide to the point where the treatment is most needed. It also enables one to successfully treat one branch of a tree without treating the entire tree, or to successfully destroy the insects on one plant without fumigating the entire room or space in which said plant in located. The very close proximity of the gas evolving powder to the pests being destroyed, thus enables the operator to more completely envelop the injurious organisms with a given amount of liberated toxic gases than is possible with ordinary powders or liquids heretofore employed.

That is to say, due to the liberation of the gas from a number of small particles in the immediate vicinity of the insect, each is exposed to a higher concentration of poisonous gas than would be possible by the treatment of the infested plants by means of the same amount of gas liberated from a few selected and more widely separated points.

In the use of this material on enclosed citrous trees and plants even that portion which falls to the ground is not lost, as is the case with most insecticide powders, since the gas liberated from said portion will diffuse through the air, ascend and reach the insects infesting the plants. This is particularly true of low growing crops. It therefore results that whereas in the usual dusting powders great difficulties are encountered in bringing the powder into actual contact with all the insects infesting the plant, this invention makes it possible to destroy the most inaccessible pests by means of the gas liberated from the powder.

It has been found advisable in applying the insecticide in practice to employ it under such conditions that the hydrocyanic acid is not taken up by the plant tissues, that is said plants should be in a dry condition, rather than in a wet condition or else the quantity employed should not be sufficient to injure the plant. There are a large number of powders that may be used as diluents, such as gas black, colloidal zinc oxide, lithopone, sublimed white lead, corroded white lead, ground barytes, ochre, diatomaceous earth, ground slate, china clay, chalk, sulphur, talc, lead arsenate and related arsenicals, tobacco dust, glauconite, flour, generator sludge, or any other powder that will not impair the valuable properties of the cyanide, or injure the foliage. The diluent gives body to the cyanide mass, and enables the whole to be more easily forced out of dusting machines onto the insects or plants.

It is quite possible to combine this cyanide with various insecticides and fungicides such as calcium arsenate, so that certain insects may be killed by the cyanide and a toxic residue left upon the plant, which will be effective in the control of other insects and fungus diseases not destroyed by the action of the cyanide.

The amount of this insecticide required per acre varies greatly depending on the nature of the crop. It is frequently applied in amounts varying from 20 to 55 pounds per acre. With proper precautions to avoid any possible chance of the inhaling of the poisonous gas, animals may be treated with this cyanide mixed with suitable inert material.

It is obvious that those skilled in the art may vary the details of the process and the composition of the product without departing from the spirit of the invention and therefore, I do not wish to be limited to the above disclosure except as may be required by the claims.

What is claimed is :—

1. A method of destroying pests which comprises providing a subdivided mass containing a cyanide which is decomposable by the moisture of the air liberating hydrocyanic acid gas in toxic concentrations, mixing therewith a substantial proportion of an inert diluent, and dusting the space occupied by said pests therewith, the inert diluent aiding in the uniform distribution of the cyanide.

2. A method of destroying pests which comprises providing a subdivided mass containing an alkaline earth metal cyanide which is decomposable by the moisture of the air liberating hydrocyanic acid gas in toxic concentrations, mixing therewith a substantial proportion of an inert diluent, and dusting plants inhabited by said pests therewith, the inert diluent aiding in the uniform distribution of the cyanide and preventing injury to the foliage thereby.

3. A method of destroying pests which comprises providing a subdivided mass containing an alkaline earth metal cyanide which is decomposable by the moisture of the air liberating hydrocyanic acid gas in toxic concentrations, mixing therewith a substantial proportion of an inert diluent and an arsenical powder, and dusting plants inhabited by said insects therewith, the inert diluent aiding in the uniform distribution of the cyanide and preventing injury to the foliage thereby.

4. A method of destroying pests which comprises providing a subdivided mass containing an alkaline earth metal cyanide which is decomposable by the moisture of the air liberating hydrocyanic acid gas in toxic concentrations, mixing therewith a substantial proportion of an inert diluent and an arsenical powder, and dusting plants inhabited by said insects therewith, the inert diluent aiding in the uniform distribution of the cyanide and preventing injury to the foliage thereby, the arsenical powder being capable of continuing to exert its toxic effect after the escape of the hydrocyanic acid gas.

5. A method of destroying pests which comprises providing a subdivided mass containing a cyanide which is decomposable by the moisture of the air liberating hydrocyanic acid gas in toxic concentrations, mixing therewith a substantial proportion of an inert diluent, and dusting the space occupied by said pests therewith, the inert diluent aiding in the uniform distribution of the cyanide, the rate of application of the mass being from 20 to 55 pounds per acre.

6. A composition for destroying pests comprising a subdivided mass of a cyanide which is decomposable by the moisture of the air liberating hydrocyanic acid gas in toxic concentrations mixed with a substantial proportion of an inert diluent which aids in the uniform distribution of the cyanide and prevents injury to the foliage thereby.

7. A composition for destroying pests comprising a subdivided mass of a cyanide which is decomposable by the moisture of the air liberating hydrocyanic acid gas in toxic concentrations mixed with a substantial proportion of an inert diluent which aids in the uniform distribution of the cyanide and prevents injury to the foliage thereby and containing an arsenical powder which is capable of exerting a toxic effect after the escape of the hydrocyanic acid gas.

8. As an article of manufacture, a composition of matter which comprises a mixture of inert material with a cyanogen compound of a metal, substantially free from alkali metal compounds.

9. As an article of manufacture, a composition of matter which comprises a mixture of inert material with a cyanogen compound of calcium, substantially free from alkali metal compounds.

10. A method of destroying pests which comprises exposing a mass containing a cyanogen compound and an inert material to the air to cause liberation of a cyanogen gas in toxic concentrations, said inert material remaining behind.

11. A method of destroying pests which comprises exposing a mass containing a cyanide compound and an inert material to the air to cause liberation of a cyanogen gas in toxic concentrations, said inert material remaining behind.

12. A method of destroying pests which comprises exposing a mass containing an alkaline earth metal cyanide and an inert material to the air to cause liberation of a cyanogen gas in toxic concentrations, said inert material remaining behind.

13. As an article of manufacture, a composition of matter which comprises a mixture of inert material with a cyanogen compound capable of evolving gaseous hydrocyanic acid in toxic concentrations.

14. As an article of manufacture, a composition of matter which comprises a mixture of inert material with a cyanide compound capable of evolving gaseous hydrocyanic acid in toxic concentrations.

15. As an article of manufacture, a composition of matter which comprises a mixture of inert material with an alkaline earth metal cyanide capable of evolving gaseous hydrocyanic acid in toxic concentrations.

16. As an article of manufacture, a composition of matter which comprises a mixture of inert material with a cyanogen compound capable of evolving gaseous hydrocyanic acid in toxic concentrations, the relative amounts of cyanogen compound and inert material being one part of cyanogen compound to two to nine parts of inert material.

In testimony whereof I affix my signature.

KENNETH F. COOPER.